United States Patent [19]
Farries et al.

[11] Patent Number: 5,127,928
[45] Date of Patent: Jul. 7, 1992

[54] METHOD FOR THE MANUFACTURE OF A WAVEGUIDE MIXER

[75] Inventors: Mark Farries, Southampton; Luksun Li, Chandler's Ford, both of England; Martin Fermann, Vienna, Austria; David Payne, Southampton, England

[73] Assignee: GEC-Marconi Limited, England

[21] Appl. No.: 576,504

[22] PCT Filed: Jan. 31, 1990

[86] PCT No.: PCT/GB90/00136
§ 371 Date: Jan. 22, 1991
§ 102(e) Date: Jan. 22, 1991

[87] PCT Pub. No.: WO90/08973
PCT Pub. Date: Aug. 9, 1990

[30] Foreign Application Priority Data
Feb. 4, 1989 [GB] United Kingdom ............... 8902512

[51] Int. Cl.$^5$ ................................................ C03B 37/00
[52] U.S. Cl. .................................. 65/2; 204/157.15; 204/157.41; 264/1.4; 264/1.5; 65/111; 65/3.11; 65/30.1
[58] Field of Search ............. 65/2, 3.11, 3.12, 3.14, 65/30.1, 30.11, 111; 264/1.4, 1.5; 204/157.15, 157.41

[56] References Cited

U.S. PATENT DOCUMENTS 4,950,042 8/1990 Gaylor et al. .................... 350/96.14

FOREIGN PATENT DOCUMENTS 2192289 1/1988 United Kingdom .

OTHER PUBLICATIONS

Fermann, Frequency-Doubling by Modal Phase Matching in Poled Optical Fibres, Electronics Letters, vol. 24, No. 14, Jul. 1988, pp. 894–895.
Stolen, Self-organized phase-matched harmonic generation in optical fibers, Optics Letters, vol. 12, No. 8, Aug. 1987, pp. 585–587.
Farries, Second-Harmonic Generation in an Optical Fibre, Electronics Letters, vol. 23, No. 7, Mar. 1987, pp. 322–324.
Osterberg, Dye laser pumped by Nd:YAG laser pulses frequency doubled in optical fiber, Optics Letters, vol. 11, No. 8, Aug. 1986, pp. 516–518.
Mizrahi, Direct test of a model efficient second-harmonic generator, Applied Physics Letters, vol. 53, No. 7, Aug. 1988, pp. 557–558.
Optics Letters, vol. 13, No. 7, Jul. 1988, M.-V. Bergot et al: "Generation of permanent optically induced second-order nonlinearities in optical fibers by poling", pp. 592–594.
Optics Letters, vol. 13, No. 11, Nov. 1988, L. J. Pointz-Wright, M. E. Fermann, and P. St. J. Russell: "Non-linear transmission and color-center dynamics in germanosilicate fibers at 420–540 nm", pp. 1023–1025.

Primary Examiner—W. Gary Jones
Assistant Examiner—John J. Bruckner
Attorney, Agent, or Firm—Kirschstein, Ottinger, Israel & Schiffmiller

[57] ABSTRACT

A method is presented for writing a permanent spatially periodic phase-matching second-order non-linearity grating in an optical waveguide. Single frequency exciting radiation is launched in a pair of guided modes of the waveguide in the presence of an external DC electric field applied in a direction transverse to the waveguide. The exciting radiation may be either co-propagating or counter-propagating. The above method may be refined by performing it once for an estimated value of exciting radiation frequency, testing the waveguide to determine error in the chosen estimate, erasing the grating and re-performing the method using a corrected value for the frequency of the exciting radiation.

13 Claims, 4 Drawing Sheets

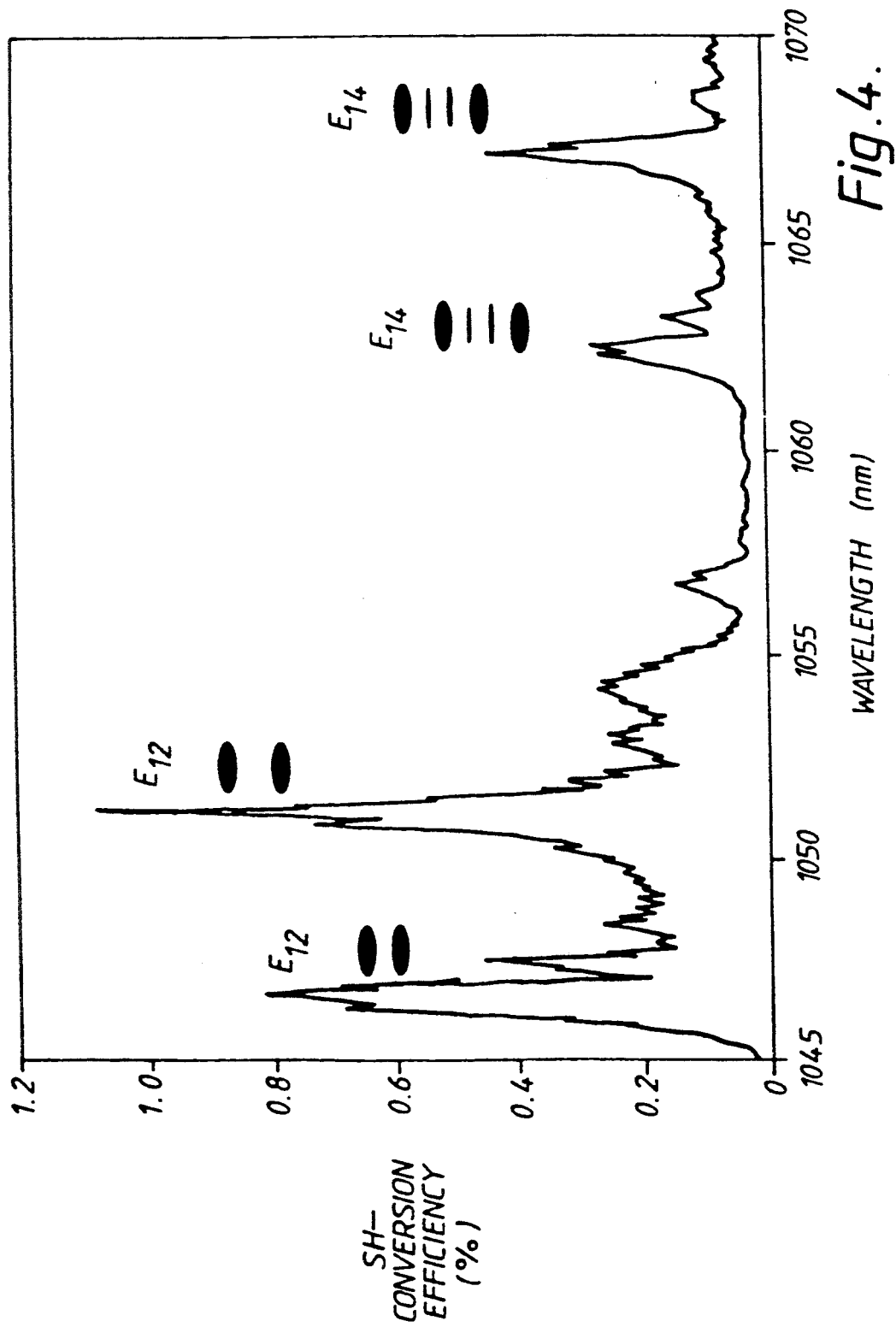

1

METHOD FOR THE MANUFACTURE OF A WAVEGUIDE MIXER

TECHNICAL FIELD

The present invention concerns improvements in or relating to methods for the manufacture of waveguide mixers. It concerns thus the manufacture of waveguides, in particular but not exclusively waveguides implemented using optical quality fibre. Mixers have application for second harmonic generation and for three wave mixing for frequency up conversion and or down conversion.

BACKGROUND

Frequency-mixing of optical waves has traditionally been achieved using crystals with non-inversion symmetric lattices. In the case of three-wave mixing, two waves of frequency $\omega_1$, $\omega_2$ are mixed to produce another optical wave at either the sum or the difference frequency $\omega_3 = \omega_1 \pm \omega_2$. The efficiency of the process is governed by two conditions:

(i) The crystal must have a high second-order non-linearity, which initiates the frequency-mixing process; and (ii) The effective refractive indices (or propagation constants) of the three waves must be matched in order to ensure that the waves propagate in-phase inside the crystal, a condition which is commonly referred to as phase-matching.

It has recently been shown that efficient frequency-mixing, in particular second-harmonic generation (whereby a pump-wave at frequency $\omega$ is converted into a second-harmonic at frequency $2\omega$), may be obtained in spatially-prepared optical fibre waveguides (Osterberg, U. and Margulis, W.: "Dye-laser pumped by Nd: Yag laser pulses frequency-doubled in a glass optical fibre", Opt. Lett., 1986, 11, p 516; Farries, M. C. et al: "Second-harmonic generation in an optical fibre by self-written-grating", Electron. Lett. 1987, 23, p 322; Stolen, R. H. and Tom, H. W. K: "Self-Organisation phase-matched harmonic generation in optical fibres", Opt. Lett., 1987, 12, p 585). The fibres are usually prepared by exciting them simultaneously with intense radiation at two different wavelengths, a fundamental and the second harmonic, e.g. 532 nm and 1.064 μm. This process has been shown to produce a permanent spatially-periodic second-order susceptibility ($\chi^{(2)}$) in the fibre. The efficiency of of this process has been up to 10% for an input peak power of 1 kw (Farries M. C. "Efficient second-harmonic generation in an optical fibre", Proc. Colloquium on Non-Linear Optical Waveguides, London IEE 1988).

It is believed that the second-order susceptibility arises from the orientation of multi-photon-excited defect centres under the influence of a self-induced internal dc-field. The internal field is generated by a third-order nonlinear process involving both the exciting radiations at 1.064 μm and at 532 nm.

Recently, it has been shown that a much greater second-order susceptibility may be produced in a fibre by applying a large ($>100$ V/μm) external dc electric-field across the fibre at the same time as defects are being excited by intense blue light propagating in the core in a guided mode (Bergot, M. V. et al: "Generation of permanent optically-induced second-order non-linearities in optical fibres by poling"), Opt. Lett., 1988, 13, p. 592). The increase in $\chi^{(2)}$ is due to the much larger electric field inside the fibre. However, in this reported experiment, second-harmonic conversion efficiency was very low, since no phase-matching between applied infra-red wavelength waves was achieved.

A degree of phase-matching has since been demonstrated using a non-periodic second-order non-linearity (Fermann, M. E. et al: "Frequency-doubling by modal phase-matching in poled optical fibres", Electron. Lett. 24, 1988, p. 894). Here phase-matching has been achieved by exploiting the phase velocity difference which occurs between the pump in the lowest-order guided mode and the second-harmonic in a higher-order guided mode. This technique has the disadvantage that is is extremely sensitive to the small changes in fibre parameters along the length.

DISCLOSURE OF INVENTION

This invention provides a technique for producing a periodic nonlinear susceptibility in a waveguide which allows phase-matching for frequency-mixing to be obtained between different guided modes inside the waveguide. As a result efficient frequency-mixing may be obtained. The method is much less sensitive to fluctuations in waveguide parameters.

In accordance with the invention thus there is provided a method for the manufacture of a waveguide mixer, which method includes the following procedural steps; providing a waveguide which waveguide incorporates a multiplicity of excitable defect centres and is capable of sustaining a plurality of guided modes; launching an exciting radiation of a predetermined single frequency into at least two guided modes of the waveguide; applying, simultaneously with propagation of the exciting radiation in said at least two guided modes, an external dc electric field transverse to the waveguide thereby to produce in the waveguide a permanent spatially-periodic phase-matching second-order non-linearity grating.

The waveguide specified above conveniently may have the form of an optical fibre. This fibre may be of silica and include a core which is doped. It is preferable that this core includes one or more of the following dopants:

$GeO_2$; $B_2O_5$; $Al_2O_3$; or, $B_2O_3$.

Mixer performance may be improved by pre-treatment of the provided waveguide to enhance the concentration of the excitable defect centres. Such pre-treatment may include for example high energy radiation; exposure to hydrogen gas under elevated pressure; waveguide production in oxygen starved ambient; or, addition of defect promoting dopants, for example, alkali halides. In the case of a fibre waveguide, defect concentration may also be enhanced by pulling at elevated temperature.

The exciting radiation launched in the guided modes of the waveguide may be either co-propagating or counter-propagating.

It is possible to remove the aforesaid grating by bleaching. This property may be utilised in a refinement of the above method to achieve higher precision. In accordance with a further aspect of the invention thus there is provided a method wherein the defined procedural steps are first conducted using exciting radiation of a predetermined estimated frequency followed by an applications trial at one or more design frequencies to quantify error in said predetermined estimated frequency; erasing said permanent spatially-periodic phase-matching second-order non-linearity grating; and repeating said procedural steps using exciting radiation of a predetermined corrected frequency.

The grating may be erased by treatment at an elevated temperature, or alternatively by launching exciting radiation into the waveguide in the absence of any applied poling electric field.

BRIEF INTRODUCTION OF THE DRAWINGS

In the drawings accompanying the specification:

FIG. 4 is a graph showing measured second-harmonic conversion efficiency as a function of pump-wavelength.

DESCRIPTION OF THE PREFERRED EMBODIMENTS

So that this invention may be better understood embodiments therefore will now be described and reference will be made to the drawings aforesaid. The description that follows is given by way of example only.

For simplicity, in the text that follows, discussion of the frequency-mixing process is restricted to the specific case of second-harmonic generation.

Optical fibre poling involves the application of a strong dc-field across a fibre and the simultaneous launching of high-intensity blue light (the exciting radiation) into the fibre. This generates a non-periodic second-order susceptibility $\chi^{(2)}$ inside the fibre core, provided the fibre propagates only one single transverse mode (or a large number of transverse modes). In an intermediate regime, however, where the fibre sustains a few modes only, mode interference (or "beating") leads to a periodic blue-light intensity distribution inside the fibre. Defects are then preferentially excited at the intensity maxima and are subsequently aligned in the presence of the dc-field. It is this intermediate regime that is utilised in the present method. In this way a second-order susceptibility grating may be written inside the fibre core.

Figure 1:
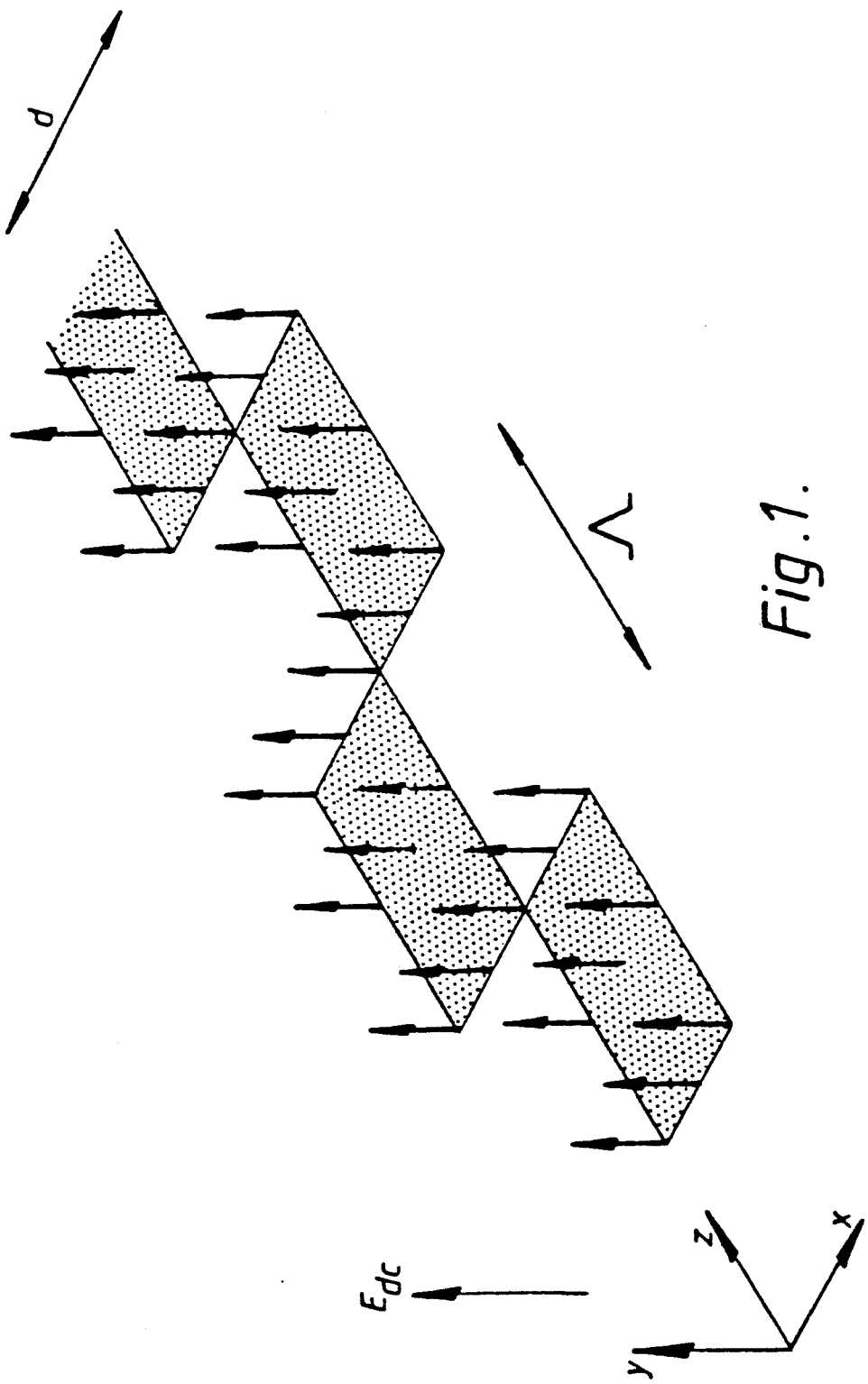
FIG. 1 is a schematic representation of a second-order susceptibility grating written by mode-interference between the fundamental and next higher-order mode in an optical fibre waveguide.

That second-order susceptibility grating written by mode interference between the $LP_{01}$ ($E_{11}$) and $LP_{11}$ ($E_{12}$) modes is shown schematically in FIG. 1. Here co-ordinate z represents the direction of propagation, and co-ordinates x and y the transverse co-ordinate of the fibre core (diameter d). The shaded regions represent regions of high optical intensity in the core, the period $\Lambda$ being the result of phase slippage between the two modes, which have different phase velocities. The applied poling electric-field $E_{dc}$ is applied in the y-direction. Note that because the interfering modes have different transverse field distributions, (i.e. the modes are of different order) the resulting intensity distribution varies transversely as well as longitudinally in the core. The induced $\chi^{(2)}$- grating conforms to the power flow inside the fiber core, which follows a zig-zag line. In the figure, the arrows shown represent the aligned electric dipoles inside the fibre core.

The grating period $\Lambda$ due to modal interference is given by the difference in propagation constants between the $LP_{01}$ ($E_{11}$) and the $LP_{11}$ ($E_{12}$) modes at the blue writing-frequency $\omega L$, i.e.:

$$\frac{2\pi}{\Lambda} = \beta(LP_{11}; \omega_b) - \beta(LP_{01}; \omega_b);$$

Where $\beta$ ($LP_{nm}$; $\omega_b$) is the propagation constant of mode $LP_{nm}$ at frequency $\omega_b$. When high-intensity infrared light is launched into the fibre (the "reading" wave), phase-matching and thus efficient second-harmonic generation may be obtained for an infrared pump-wave at frequency $\omega$ propagating in the $LP_{01}$ ($E_{11}$) mode and a second-harmonic wave at frequency $2\omega$ propagating in a higher-order mode. Phase-matching occurs when the beat length $\Delta\beta$ corresponding to the difference in the $\omega$ and $2\omega$ propagation constants equals the beat length of the second-order susceptibility grating previously written, i.e.:

$$\frac{2\pi}{\Lambda} = \beta(LP_{nm}; 2\omega) - 2\beta(LP_{01}; \omega) = \Delta\beta$$

Figure 2:
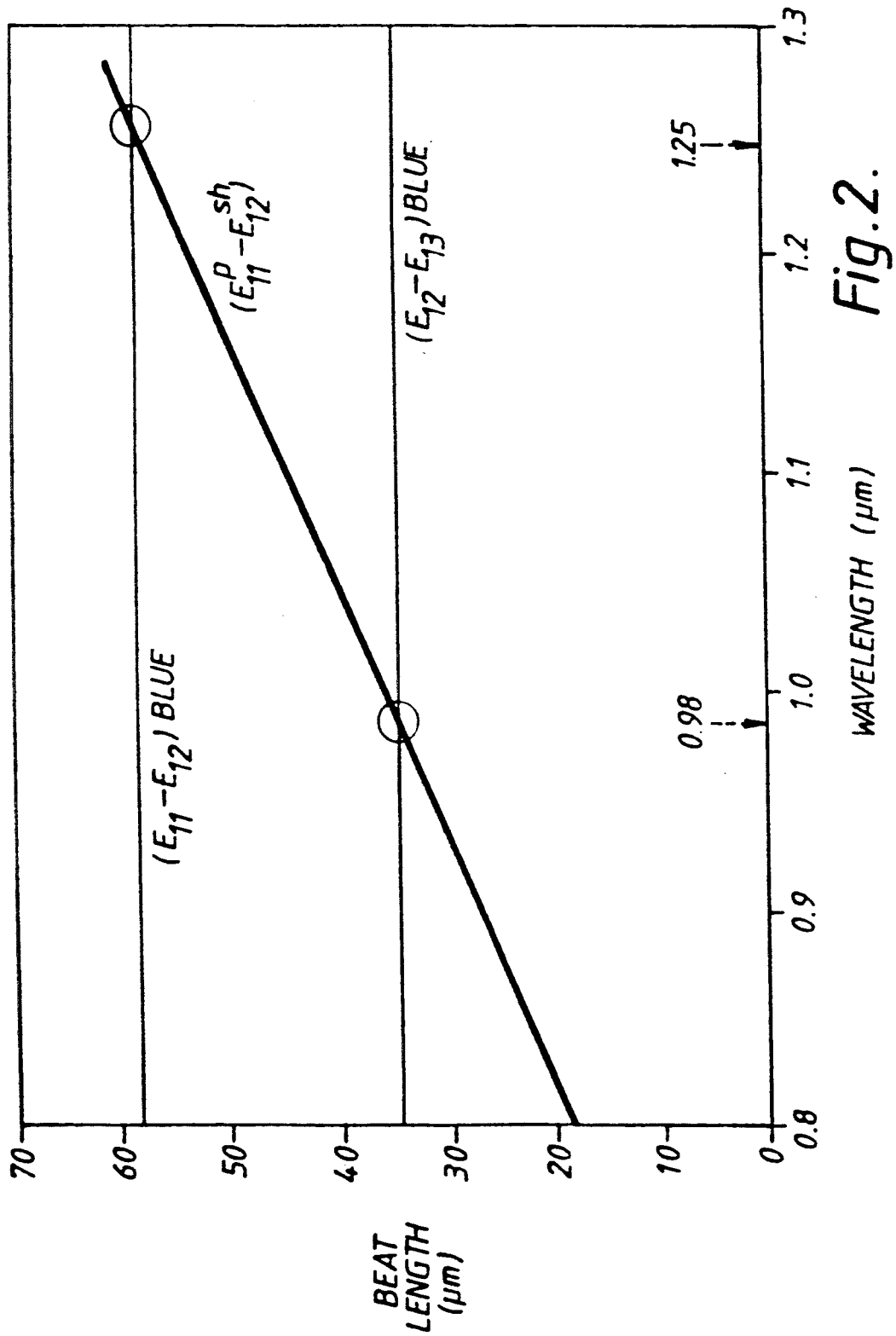
FIG. 2 is a graph showing beat lengths of modes in an optical fibre as a function of wavelength.

An example of an approximate choice of wavelengths for the blue ("writing") modes and the infrared pump and second-harmonic ("reading") modes is shown in FIG. 2 for a typical fibre design, i.e. a standard germanosilicate-core fibre with a numerical aperture NA= 0.30 and a core radius of 1.3 $\mu$m. Illustrated is the grating period generated by a set of mode pairs at the blue writing wavelength of 488 nm and the beat length corresponding to $\Delta\beta$ for an infrared pump-wave in the $LP_{01}$ ($E_{11}$) and its second-harmonic in the $LP_{11}$ ($E_{12}$) or $LP_{02}$ ($E_{13}$)-mode. Interference between the blue $E_{11}$-/$E_{12}$-modes produces a $\chi^{(2)}$-grating having a 58 $\mu$m period. For the blue $E_{12}$-$E_{13}$-modes, the period is 34 $\mu$m. Also displayed is the beat length corresponding to the difference $\Delta\beta$ in propagation constants between the second-harmonic and pump-waves for an infrared pump-wave in the $E_{11}$-mode and a SH in the $E_{12}$-mode. Phase matching between the $\chi^{(2)}$-grating and the fundamental $E_{11}$ and SH $E_{12}$-mode is obtained at those wavelengths for which the grating period equals $\Delta\beta$, i.e. at 0.98 $\mu$m and 1.25 $\mu$m.

In the following, a mathematical description of the second-order susceptibility gratings written by mode-interference is given:

Without loss of generality, here it is assumed that blue light only is launched into the fundamental $LP_{01}(E_{11})$ and the second-order $LP_{11}(E_{12})$-guided modes of the optical fibre. Further, it is assumed that the fibre is polarisation-preserving and that the guided modes (designated a and b) are linearly-polarised and plane-parallel to each other. Both guided modes are considered to propagate equal; power. The normalised field distributions in the two modes are then given by:

$$E_a = \psi_a(x,y)\exp(i\beta_a z); \quad (1a)$$

and $$E_b = \psi_b(x,y)\exp(i\beta_b z) \quad 1b)$$

respectfully, where $\psi_{a;b}$ are the transverse amplitude distributions and $\beta_{a;b}$ are their propagation constants. These guided modes interfere in the fibre to form an intensity distribution:

$$I(x,y,z) = |E_a + E_b|^2 \quad (2a)$$

$$= |\psi_a|^2 + |\psi_b|^2 + 2\psi_a\psi_b^* \cos(GZ); \quad (2b)$$

where $G = \beta_a - \beta_b$ is the grating constant. If the guided modes are of the correct wavelength, i.e. around 480 nm for germanosilicate fibres, defect centres will be excited over a period of time, where the steady-state defect excitation is approximately proportional to the blue light intensity (Poyntz-Wright, L. J. et al: "Two-photon absorption fibres", Opt. Lett., 13, 1988 p. 1023). If now a strong poling field is applied along one of the optical axes of the fibre, a $\chi^{(2)}$ 111 tensor element parallel to the poling field is created, where, for simplicity, it is assumed that in steady-state the induced $\chi^{(2)}$ is proportional to the intensity of the blue light interference pattern. The $\chi^{(2)}$-distribution in the fibre core is then given as:

$$\chi^{(2)}(x,y,z) = \chi_0^{(2)}(x,y) + \chi_m^{(2)}(x,y)\exp(e^{iGZ} + e^{-iGZ}); \quad (3a)$$

where:

$$\chi_0^{(2)} = a[|\psi_a|^2 + |\psi_b|^2]; \text{ and} \quad (3b)$$

$$\chi_m^{(2)} = a\psi_a\psi_b^* \quad (3c)$$

are the transverse $\chi^{(2)}$-distributions corresponding to the zero and first order Fourier components of $\chi^{(2)}$ in spatial-frequency space and $a$ is a constant. From the mixing of the $LP_{01}(E_{11})$ and $LP_{11}(E_{12})$ modes the distribution of $\chi^{(2)}$ along the fibre is as shown schematically in FIG. 1. When an infrared pump-wave $\psi_p$ (x,y)exp($i\beta_p z$) of frequency $\omega$ is launched into the fibre, the $\chi^{(2)}$-grating leads to coupling to a second-harmonic (SH)-wave: $\psi_{sh}$ (x, y)exp($i\beta_{sh} z$) at $2\omega$. It may then be shown that the power generated in the SH-wave is given by (esu units):

$$P_{sh}^{2\omega}(z) = \frac{32\pi^3\omega^2 z^2 (p_p^\omega)^2}{n(\omega)[n(\omega)]^2 c^3 A} (\chi_m^{(2)} 0_m)^2 \text{sinc}^2[\tfrac{1}{2}(G - \Delta\beta)z]$$

where $p_p^\omega$ is the power in the pump-wave, $\bar{\chi}^{(2)}_m$ refers to the average over the effective core area A, $n(\omega)$ is the refractive index at frequency $\omega$, c is the velocity of light, $\Delta\beta = \beta_{sh} - 2\beta_p$ and $0_m$ is the overlap integral given by:

$$0_m = \frac{\sqrt{A}}{\bar{\chi}_m^{(2)}} \int \int_{-\infty}^{+\infty} \{\chi_m^{(2)}(x,y)[\psi_p(x,y)]^2\}^* \psi_{sh}(x,y) dx dy$$

In deriving equation (4) all phase terms for which $G \neq \Delta\beta$ have been neglected. It may be seen from equation (5) that the asymmetric $\chi^{(2)}$ allows coupling of the $LP_{01}$ (pump-wave only to asymmetric SH-waves. In general, even when several blue modes interfere to form a $\chi^{(2)}$-grating, only pairs of modes can contribute to a $\chi^{(2)}m$ at the spatial frequency given by their respective difference in propagation constants. Therefore equation (5) effectively always represents the amplitude overlap integral of five modes (two blue, two infrared and one SH), where in order to get SH-conversion, the product of their respective parities has to be positive.

Figure 3:
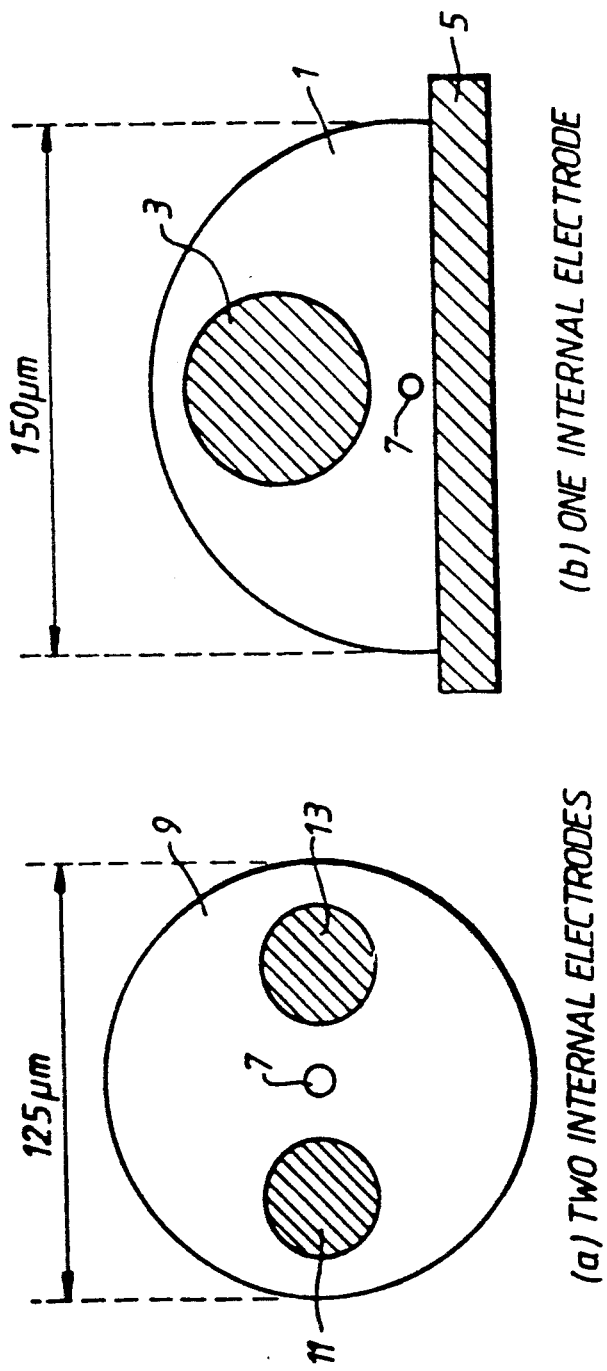
FIG. 3 shows two cross-sections of different fibres with one or more internal electrodes.

A specific example will now be presented:

In order to align defect centres, the application of a very strong dc-electric field to the fibre core is necessary. DC-electric fields up to 200 V/μm may be applied to D-shaped fibres 1 (FIG. 3b) with an internal electrode 3 and an external electrode 5. DC-electric fields up to 700 V/μm may be applied to fibres 9 with two internal electrodes 11 and 13 (FIG. 3a). (By way of background reference, the reader is referred to United Kingdom Patent Application No. 2,192,289 published Jan. 6, 1988 which describes the manufacture of fibres including internal electrodes). In order to produce these types of fibre 1,9 a standard fibre preform is taken and either one or two holes are drilled next to the preform core 7. In order to produce a D-shaped preform, one side of the preform 1 has to be removed by grinding. Fibre pulling is conventional although it is necessary to use relatively low pulling temperatures in order to avoid a deformation of the fibre. The flat side of a D-shaped fibre 1 does not have to be polished to give a sufficiently smooth surface, since the pulling process smooths out unavoidable surface irregularities introduced by grinding. The internal electrode 3 consists either of an InGa alloy with a melting temperature of about 20° C. pumped into the holes in the fibre, or can be incorporated during the fibre-drawing process. In the case of the D-shaped fibre 1, the flat side is pressed onto a smooth metal plate which provides the second electrode 5. Electrical contact is established by inserting a gold wire into the fibre 1 and soldering it onto a circuit board (not shown).

In the case of germanosilicate fibres, defect excitation using a cw Argon laser operating at 488 nm has so far produced the best results. The optimum excitation intensity is about 6 mW/μm² independent of poling field strength; higher intensities lead to defect excitation saturation and a negative effect on SH-conversion efficiency. It is found that the second-order non-linear susceptibility $\chi^{(2)}$ induced by poling is linearly proportional to the applied poling field strength. Using poling field strengths of 600 V/μm, a $\chi^{(2)}$ (2 $\omega = \omega + \omega$) of about 30–90% of that of the well-known non-linear crystal potassium di-hydrogen phosphate KDP is inducable.

An example of second-harmonic generation (SHG) in the fibre described earlier using phase matching provided by mode-interference gratings is shown in FIG. 4, which illustrates second-harmonic (SH) conversion efficiency as a function of pump wavelength. Here the grating was written by mode interference between the $LP_{02}(E_{13})$ and the $LP_{11}(E_{12})$-modes using cw defect-excitation light of 40 mW power at 488 nm and a poling field strength of 140 V/μm. SH-conversion is then obtained for an infrared pump-wave in the $LP_{01}(E_{11})$-mode and its SH in the $LP_{11}(E_{12})$-mode. The amplitude overlap integral for this process is here only 3%. The spatial coherence length is 6 cm. From FIG. 4 it will also be noted that there is a splitting for the respective phase-match peaks. This arises due to the two polarisation orientations possible for each blue (writing) mode pair. Owing to fibre birefringence, two $\chi^{(2)}$-gratings of slightly different periods have been produced. These $\chi^{(2)}$-gratings have the same orientations.

From the figure, the SH-conversion efficiency is 1% for a pump-power of 150 W at 1050 nm. Since the overlap integral could be increased to values >10% if the $LP_{01}(E_{11})$ and $LP_{11}(E_{12})$-modes were employed in both the writing and reading process and since a poling field strength five times larger than used here is possible, conversion efficiencies of order 10% with a pump power of only 10 W are predicted.

It is suggested that even higher non-linearities and conversion efficiencies could be achieved by co-doping the fibre with $P_2O_5$. High-energy irradiation of the fibres prior to poling, hydrogen treatment, fibre fabrication under oxygen-starved conditions, doping with aluminium, or alkali halides (e.g. $Na^+$), or fibre pulling at high temperature is known to lead to increased defect concentrations and should thus also lead to higher SH conversion efficiencies.

It has been found that mode-interference gratings are not disturbed by low-intensity infrared light, i.e. intensities smaller than 10 W/$\mu m^2$. On the other hand, the gratings are bleachable by exposure to high temperatures, i.e. >100° C. They are also bleachable by launching blue light into a poled fibre without the presence of a poling field. This latter property provides the opportunity to write the gratings in a two-stage process to obtain phase-matched SH-conversion at precisely the desired infrared design wavelength (or wavelengths) as follows. Firstly a calculation of effective mode indices gives an approximate value of the blue writing wavelength required for obtaining SH-conversion at the design infrared wavelength (or wavelengths)-(owing to very small fibre non-uniformities, an exact calculation is not possible). A first grating is then written into the fibre and tested for the design infrared wavelength (or wavelengths). The grating is then erased. On the basis of this test measurement, in a second stage the blue writing wavelength can be adjusted slightly (i.e. corrected) to obtain the desired design phase-match condition precisely.

Second-order susceptibility gratings may also be written by counterpropagating blue waves of the same wavelength in the optical fibre. For example, if the two counterpropagating waves are each travelling in a respective fundamental mode with propagation constants $+\beta_a$ and $-\beta_a$, a second-order susceptibility grating:

$$\chi^{(2)}(x, y, z) = \chi O^{(2)}(x, y) + \chi_m^{(2)}(x, y) \cos(2\beta_a z),$$

is written in the fibre. This type of grating may then be used for frequency mixing in a manner similar to that already described.

We claim:

1. A method of manufacturing a waveguide mixer comprising the steps of:
    providing a waveguide, which waveguide incorporates a multiplicity of excitable defect centres and is capable of sustaining a plurality of guided modes;
    launching through the waveguide an exciting radiation of a predetermined single frequency in at least two guided modes within the waveguide in the absence of an exciting radiation other than said single frequency; and
    applying simultaneously with propagation of the exciting radiation in said at least two guided modes, an external dc electric field transverse to the waveguide, thereby to produce in the waveguide a permanent spatially-periodic phase-matching second-order non-linearity grating.

2. The method as claimed in claim 1 wherein the waveguide is an optical fibre.

3. The method as claimed in claim 2 wherein the optical fibre is of silica and has a core doped with at least one of the following dopants:

$GeO_2$; $P_2O_5$; $Al_2O_3$; and $B_2O_3$.

4. The method as claimed in claim 1 further comprising the step of pre-treating the waveguide to enhance concentration of the excitable defect centres.

5. The method claimed in claim 4 wherein the pre-treating step is performed by one of the following treatments: high energy radiation; exposure to hydrogen gas under elevated pressure; production in oxygen starved ambient; and addition of a defect promoting dopant.

6. The method as claimed in claim 2 further comprising pre-treating the fibre by pulling at an elevated temperature to enhance concentration of excitable defect centres.

7. The method as claimed in claim 1 wherein the exciting radiation launched in said at least two distinct guided modes is co-propagating.

8. The method as claimed in claim 1 wherein the exciting radiation launched in said at least two guided modes is counter-propagating.

9. The method as claimed in claim 1 wherein the procedural steps are performed for an estimated value of frequency for the exciting radiation and followed by;
    test measurement to determine an error in an estimated value of frequency of the exciting radiation;
    erasure of the grating; and
    repetition of the procedural steps performed using a corrected value for the frequency of the exciting radiation.

10. The method as claimed in claim 9 wherein the grating is erased by heat treatment at elevated temperature.

11. The method as claimed in claim 9 wherein the grating is erased by launching exciting radiation in the waveguide in the absence of applied external electric field.

12. A method of manufacturing a waveguide mixer comprising the steps of:
    (A) providing a waveguide, which waveguide incorporates a multiplicity of excitable defect centres and is capable of sustaining a plurality of guided modes;
    (B) pre-treating the waveguide to enhance concentration of the excitable defect centres by carrying out one of the following treatments:
        (a) high energy radiation,
        (b) exposure to hydrogen gas under elevated pressure,
        (c) production in oxygen starved ambient, and
        (d) addition of a defect promoting dopant;
    (C) launching through the pretreated waveguide, an exciting radiation of a predetermined single frequency in at least two guided modes within the waveguide in the absence of an exciting radiation other than said single frequency; and
    (D) applying simultaneously with propagation of the exciting radiation in said at least two guided modes, an external dc electric field transverse to the waveguide, thereby to produce in the waveguide a permanent spatially-periodic phase-matching second-order non-linearity grating.

13. The method as claimed in claim 12, wherein the waveguide is a fibre, and wherein the pre-treating step is performed by pulling the fibre at an elevated temperature.

* * * * *